United States Patent
Nelson et al.

(10) Patent No.: US 11,095,563 B1
(45) Date of Patent: Aug. 17, 2021

(54) SYSTEMS AND METHODS FOR AUTOMATIC PRIORITY ASSIGNMENT FOR VIRTUAL LINKS

(71) Applicant: Rockwell Collins, Inc., Cedar Rapids, IA (US)

(72) Inventors: Brent J. Nelson, Marion, IA (US); David A. Miller, Swisher, IA (US); James M. Zaehring, Edmonds, WA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 69 days.

(21) Appl. No.: 15/824,924

(22) Filed: Nov. 28, 2017

(51) Int. Cl.
   *H04L 12/851* (2013.01)
   *H04L 12/931* (2013.01)
   *H04L 12/24* (2006.01)
   *H04L 12/725* (2013.01)
   *H04L 12/841* (2013.01)

(52) U.S. Cl.
   CPC ...... *H04L 47/2433* (2013.01); *H04L 41/0816* (2013.01); *H04L 45/302* (2013.01); *H04L 47/283* (2013.01); *H04L 49/70* (2013.01)

(58) Field of Classification Search
   CPC . H04L 47/2433; H04L 47/283; H04L 45/302; H04L 49/70; H04L 41/0816
   See application file for complete search history.

(56) References Cited

U.S. PATENT DOCUMENTS

| 2008/0043768 | A1* | 2/2008  | Lopez      | H04L 47/2416 370/412 |
| 2016/0294697 | A1* | 10/2016 | Varadarajan | H04L 47/12 |
| 2016/0294720 | A1* | 10/2016 | Varadarajan | H04L 47/60 |
| 2019/0081734 | A1* | 3/2019  | Monnier    | H04L 12/40182 |

* cited by examiner

*Primary Examiner* — Peter P Chau
(74) *Attorney, Agent, or Firm* — Suiter Swantz pc llo

(57) ABSTRACT

A system includes a first and at least one second processing circuit, a configuration engine, and a switch. The configuration engine stores a virtual link configuration for a plurality of virtual links, which indicates a priority and a predetermined network pathway for communicating data packets from the first processing circuit to the at least one second processing circuit. The configuration engine automatically assigns priority to a first virtual link of the plurality of virtual links based on at least one of latency or jitter. The switch receives a first data packet from the first processing circuit. A first virtual link identifier is extracted from the first data packet. A first priority and a first predetermined network pathway corresponding to the first virtual link identifier from the virtual link configuration are retrieved. The first data packet is transmitted along the first predetermined network pathway based on the first priority.

20 Claims, 3 Drawing Sheets

SYSTEMS AND METHODS FOR AUTOMATIC PRIORITY ASSIGNMENT FOR VIRTUAL LINKS

BACKGROUND

The inventive concepts disclosed herein relate generally to the field of avionics systems. More particularly, embodiments of the inventive concepts disclosed herein relate to systems and methods for automatic priority assignment for virtual links.

As aircraft electronics become increasingly connected, many avionics systems are using network communications, particularly Ethernet-based networks, for high speed communications between a large variety of devices. Networks (e.g., ARINC 664 networks) can use configurable data routing to establish installations and options for how data packets move from source devices to destination devices.

Avionics networks can use virtual links to route network traffic. A virtual link is a logical unidirectional connection that defines a predetermined network pathway for communicating data packets from a source system to one or more destination systems in a network (e.g., an ARINC 664 network, an Avionics Full-Duplex Switched Ethernet (AFDX) network, an Ethernet network). Resources are assigned and guaranteed on a per-virtual link basis through the network. Each virtual link can be identified by a unique virtual link identifier (ID). Switches in the network can be structured to receive a data packet (e.g., an Ethernet frame), read the virtual link ID from the data packet, identify the virtual link from the virtual link ID, and transmit the data packet along a predetermined network pathway defined by the virtual link.

Network switches can implement prioritization in order to achieve lower latencies through the network. Current generation switches implement a high and low priority queue on a per output port basis. In other words, current generation switches utilize two priorities. Future generation switches may have more priorities (e.g., eight). Data packets are transmitted from higher priority queues before lower priority queues. ARINC 664 part 7 states that virtual link priority is "defined in the configuration table on a virtual link basis." This means that a single priority is manually and globally assigned for each virtual link.

Priority selection can be a time consuming and difficult task for a network configurator, even with regard to current generation switches with two priorities. In existing systems, the network configurator utilizes a computationally-intensive network calculus tool to determine theoretical upper bounds for data transmission delays. The network calculus tool can take a significant amount of time (e.g., up to two hours) to complete its analysis. If a particular virtual link does not meet required specifications (e.g., data transmission delays exceed latency requirements), the tool must be adjusted and rerun, which may include manual readjustment of large numbers of priorities. Each incremental adjustment can also introduce additional problems. It is highly unlikely that an optimal solution is achieved in existing systems, even with an expert assigning priority. This task will become more difficult with future generation switches including more than two (e.g., eight) priorities, making it unlikely that typical methods for priority selection can effectively achieve desired goals for latency and/or jitter.

SUMMARY

In one aspect, the inventive concepts disclosed herein are directed to a system that includes a configuration engine and a switch. The configuration engine stores a virtual link configuration for a plurality of virtual links. Each virtual link has a virtual link identifier. The virtual link configuration indicates a priority and a predetermined network pathway for communicating data packets from a first avionics processing circuit to one or more second avionics processing circuits. The configuration engine is configured to automatically assign priority to a first virtual link of the plurality of virtual links based on at least one of a latency or a jitter. The switch is configured to receive a first data packet from the first avionics processing circuit. A first virtual link identifier is extracted from the first data packet. A first priority and a first predetermined network pathway corresponding to the first virtual link identifier from the virtual link configuration are retrieved. The first data packet is transmitted along the first predetermined network pathway based on the first priority.

In a further aspect, the inventive concepts disclosed herein are directed to a method. The method includes automatically assigning priority, in a virtual link configuration, to one or more first virtual links of a plurality of virtual links based on at least one of a latency or a jitter. Each virtual link has a virtual link identifier. The virtual link configuration indicates the priority and a predetermined network pathway for communicating data packets from a first avionics processing circuit to one or more second avionics processing circuits. A first data packet is received from the first avionics processing circuit. A first virtual link identifier is extracted from the first data packet. A first priority and a first predetermined network pathway corresponding to the first virtual link identifier are retrieved from the virtual link configuration. The first data packet is transmitted along the first predetermined network pathway based on the first priority.

In a further aspect, the inventive concepts disclosed herein are directed to a network. The network includes a first switch configured to receive a first data packet from a source avionics processing circuit. A virtual link identifier is extracted from the first data packet. A first destination avionics processing circuit and a second destination avionics processing circuit to be destinations of the first data packet are determined based on the virtual link identifier. A first priority for transmitting the first data packet to the first destination processing circuit is determined based on the virtual link identifier and a first timing threshold associated with the first destination avionics processing circuit. The first data packet is allocated to a first output queue connected to the first destination avionics processing circuit based on the first priority. A second priority for transmitting the first data packet to the second destination avionics processing circuit is determined based on the virtual link identifier and a second timing threshold associated with the second destination avionics processing circuit. The second timing threshold is greater than the first timing threshold. The first data packet is allocated to a second output queue connected to the second destination avionics processing circuit based on the second priority. The first data packet is transmitted to the first destination avionics processing circuit via the first output queue. Subsequent to transmitting the first data packet to the first destination avionics processing circuit, the first data packet is transmitted to the second destination avionics processing circuit via the second output queue.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
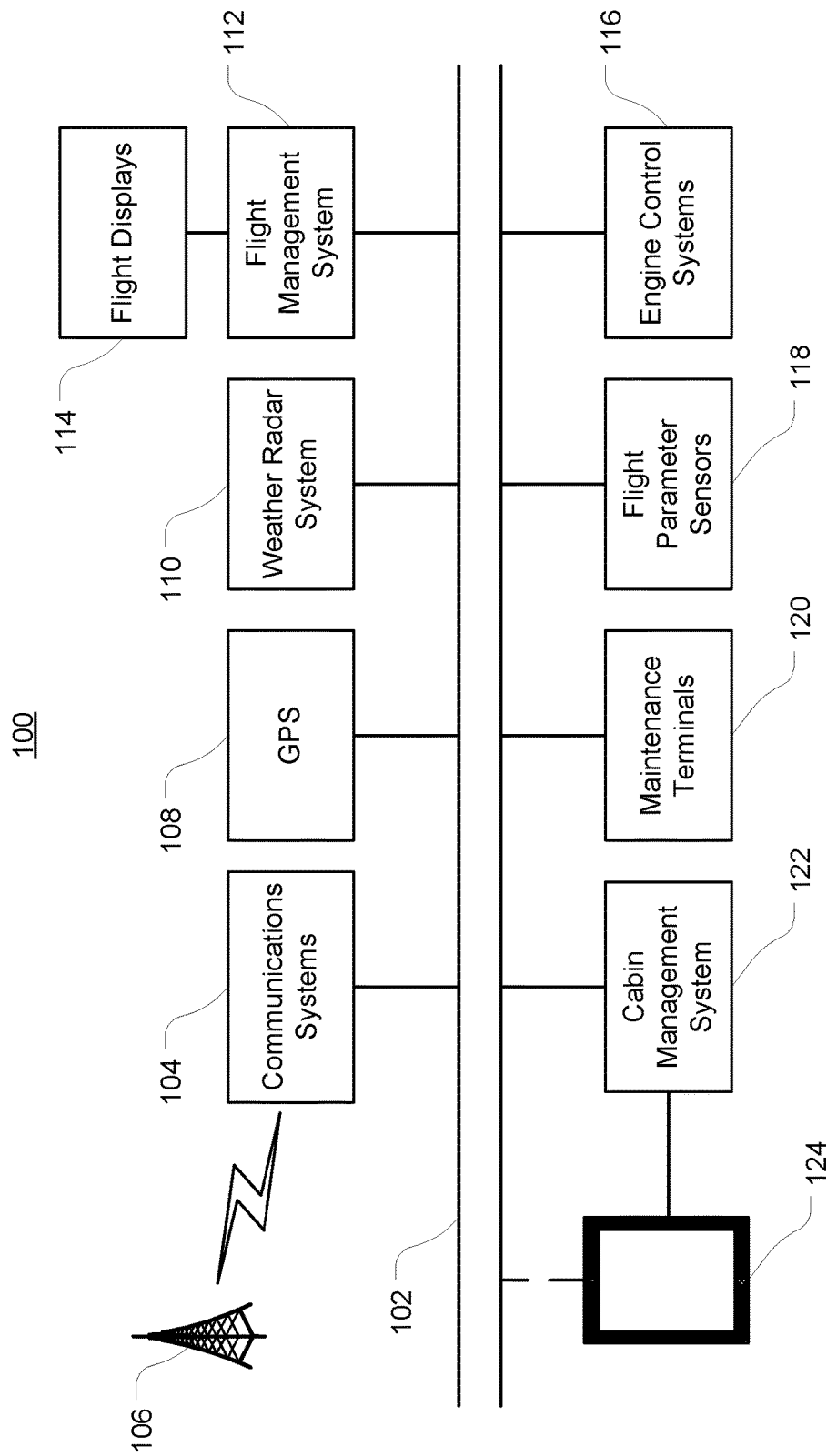
FIG. 1 is a schematic diagram of an exemplary embodiment of an aircraft electronic communication network, according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein, any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for automatically assigning priorities to virtual links at time of configuration on a per switch output port basis for an airborne platform network. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft; a spacecraft; an autonomous vehicle; a ground-based vehicle; a water-based or underwater vehicle; a subsurface or subterranean vehicle; a satellite; an aeronautical platform or in a non-vehicle application, such as a stationary communications, sensing, or testing system; a ground-based display system; an air traffic control system; a radar system; and a virtual display system).

In some embodiments, a system includes a configuration engine and a switch. The configuration engine stores a virtual link configuration for a plurality of virtual links, each defined by a unique virtual link identifier. The virtual link configuration indicates a priority and a predetermined network pathway for communicating data packets from a first avionics processing circuit to one or more second avionics processing circuits. The configuration engine is configured to automatically assign priority to a first virtual link based on at least one of latency or jitter. The switch is configured to receive a data packet from a first avionics processing circuit, extract a virtual link identifier from the data packet, retrieve a priority and a predetermined network pathway corresponding to the virtual link identifier from the virtual link configuration, and transmit the data packet along the predetermined network pathway based on the priority. The switch can be integrated with an airborne platform or other platform as described herein. For example, the virtual link configuration described herein can be associated with avionics controllers or other critical electronic devices, such as those in an aircraft cockpit or control center of the airborne platform.

Embodiments of the inventive concepts disclosed herein enable automatic priority assignment for virtual links based on at least one of latency or jitter. For example, in various embodiments, latency requirement of each virtual link is used as a mechanism to assign priority to the respective virtual link. In contrast, as mentioned above, conventional systems require a network integrator to manually to assign priority, even in highly complex systems which may require hundreds or thousands of assignments, each assignment affecting latency and jitter for the entire system. Latency and jitter calculations are performed after the manual assignment; if the network fails to satisfy scheduling requirements for latency and jitter, then the integrator must again manually adjust the assignments. By automatically assigning priority based on at least one of latency or jitter, the instant systems and methods are capable of determining virtual link priority assignments in a manner which is more technically superior to latency or jitter compared to existing systems, and in less time and using less computational power and memory than with existing systems. The network integrator need not manually and repeatedly adjust the network assignments, and the instant systems and methods can more quickly arrive at a more efficient network solution than existing systems.

Embodiments of the inventive concepts disclosed herein also enable priority to be assigned on a per switch output port basis. Accordingly, a single virtual link can have multiple priorities assigned to each output port included in the virtual link. In contrast, existing systems globally assign a single priority for each virtual link. Accordingly, existing systems assign priority based on the worst-case requirements of the virtual link, thereby providing non-optimal use of system resources. For example, if a virtual link includes a first endpoint with a 50 millisecond latency requirement and a second endpoint with a 10 millisecond latency requirement, the priority for the virtual link will be assigned based on the 10 millisecond latency requirement. In contrast, embodiments of the inventive concepts disclosed herein enable a first priority to be assigned to the switch output ports along the network pathway connected to the first endpoint based on the 50 millisecond latency requirement, and a second priority to be assigned to the switch output ports along the network pathway connected to the second endpoint based on the 10 millisecond latency requirement. To this end, the per-output port fidelity provided by the embodiments of the inventive concepts disclosed herein enables more efficient network routing than that capable with existing systems. For example, the per-output port fidelity enables the configuration engine to assign higher priorities for only critical or trouble-prone processing circuits (e.g., those with tighter latency requirements for a single consumer or those utilizing a highly-utilized output port), such as the second endpoint.

Systems manufactured in accordance with the inventive concepts disclosed herein can improve the operation of aircraft and other platforms by enabling existing avionics systems and network communication devices to operate with improved resource allocation efficiency; secure high integrity, trusted, or other critical systems from rogue or faulty Ethernet-based communications; provide network determinism; and otherwise facilitate more flexible routing of data packets through a network configuration including automatically-assigned priorities for virtual links on a per switch output port basis. Automatic priority assignment for virtual links on a per switch output port basis enables priorities to be assigned according to latency or jitter requirements of certain avionics processing circuits. Automatic priority assignments for virtual links can be made in the same network configuration as other manually assigned virtual links. Accordingly, the network configuration can be optimized at design time or configuration time rather than during runtime. Additionally, the behavior of the system can be more predictable when it is based on a predefined routing table rather than determined at runtime.

Referring now to the drawings and to FIG. 1 in particular, a schematic diagram of an aircraft electronic communication network 100 is shown according to an exemplary embodiment of the inventive concepts disclosed herein. The aircraft electronic communication network 100 includes a network interface device 102, which can receive incoming electronic transmissions (e.g., data packets, Ethernet frames) from various electronic devices directly or indirectly connected to the network interface device 102 and route the incoming transmissions to appropriate destination electronic devices based on a network configuration.

The aircraft electronic communication network 100 includes one or more devices configured to transmit and receive electronic transmissions using the network interface device 102. For example, the aircraft electronic communication network 100 includes communications systems 104 (e.g., transmitter/receiver electronics), such as a datalink, which may be configured to communicate with remote devices, such as ground station 106, satellites, or other platforms (e.g., aircraft). The aircraft electronic communication network 100 may include navigation systems, such as a GPS receiver 108, a GNSS system, or other navigation systems. The aircraft electronic communication network 100 includes a weather radar system 110 and a flight management system 112, which may be provided in an aircraft cockpit or control center, such as for receiving user inputs for controlling operation of various aircraft electronics. The aircraft electronic communication network 100 includes various engine control systems 114. The engine control systems 114 can control operation of aircraft engines (e.g., throttle control, aircraft control surface control, autoflight systems such as autothrottle or autopilot). The aircraft electronic communication network 100 may include flight parameter sensors 116, such as an inertial measurement unit (which may include one or more gyroscopes and one or more accelerometers, such as three gyroscopes and three accelerometers), an air data sensor (e.g., sensor(s) configured to detect and output an indication of static pressure), a magnetic compass, or a vision system (e.g., camera, infrared image sensor, LIDAR).

The flight management system 112 may be configured to control operation of flight displays 122, such as primary flight displays configured to display high integrity information to a pilot and/or co-pilot. The aircraft electronic communication network 100 may include various engine control systems 114 configured to The aircraft electronic communication network 100 may include maintenance terminal(s) 128, which can be configured to receive and/or execute testing and maintenance applications on various components of the airborne platform. The aircraft electronic communication network 100 can include a cabin management system 118 configured to control operation of cabin electronics (e.g., lights, entertainment devices). The aircraft electronic communication network 100 may be configured to connect portable electronic devices 120 (e.g., commercial off the shelf electronic devices, personal electronic devices) to the network interface device 102 directly or via the cabin management system 118. Various other electronic devices may be configured to communicate with the network interface device 102.

It will be appreciated that the various devices 104-120 perform various diverse functions. Accordingly, the devices 104-120 may have varying performance requirements (e.g., latency, jitter), depending on their respective functions. For example, the devices 104-120 that are involved in safety-critical systems may require higher speed and higher reliability communications than other devices. For example, flight parameter sensors 116 may have tighter (e.g., lesser) latency requirements than the weather radar system 110.

Figure 2:
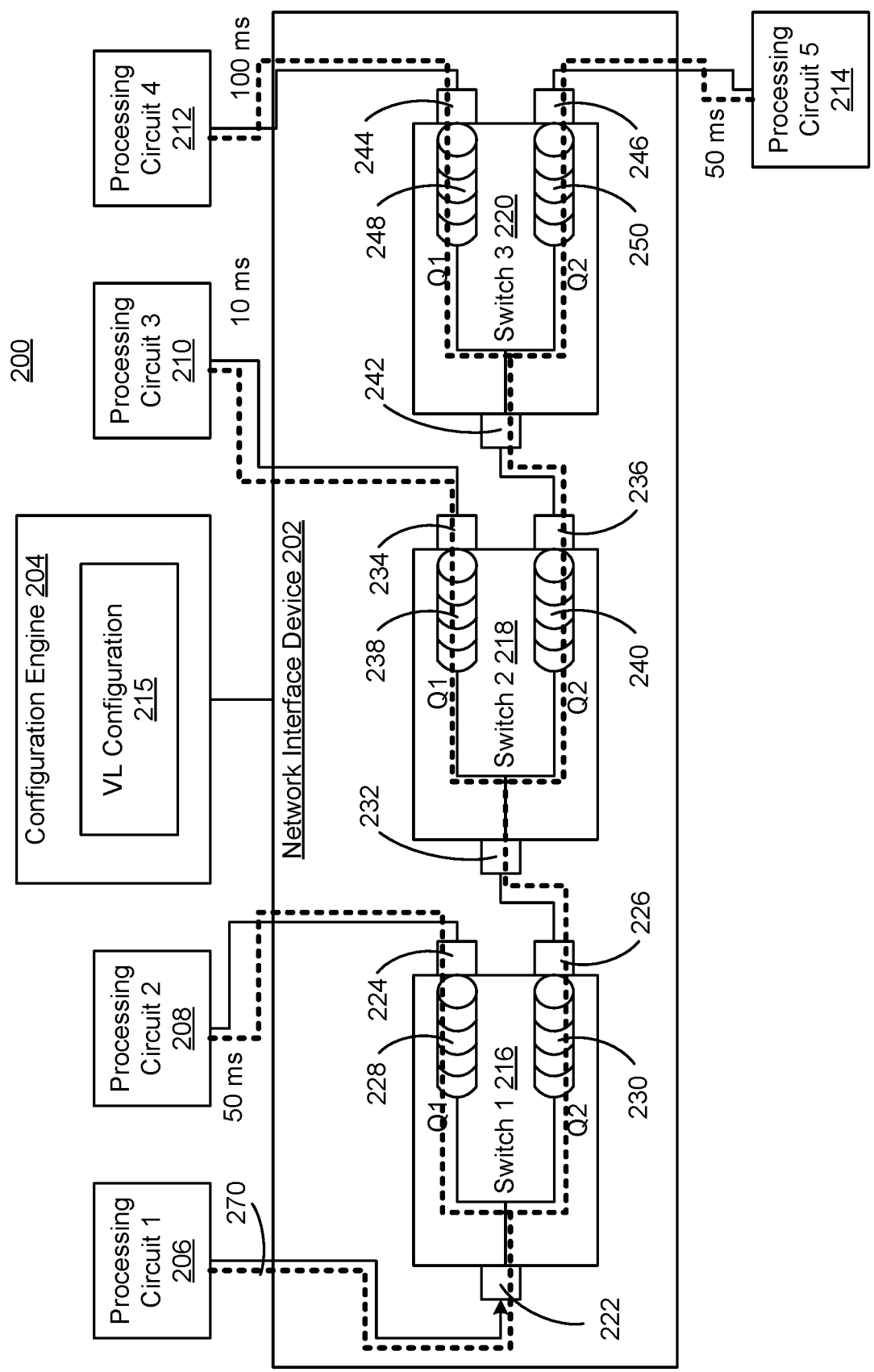
FIG. 2 is a block diagram of an exemplary embodiment of a system including a network interface device and a configuration engine for automatically assigning priority for virtual links on a per switch output port basis, including a first virtual link, according to the inventive concepts disclosed herein.

Referring now to FIG. 2, a block diagram of a system 200 is shown according to an exemplary embodiment of the inventive concepts disclosed herein. The system 200 may be configured to implement network routing utilizing automatic priority assignments for virtual links on a per switch output port basis. The system 200 includes a network interface device 202, configuration engine 204, and first, second, third, fourth, and fifth processing circuits 206, 208, 210, 212, 214. The network interface device 202 is operatively and communicatively coupled to each of the configuration engine 204 and the first, second, third, fourth, and fifth processing circuits 206, 208, 210, 212, 214. The network interface device 202 may incorporate features of the network interface device 102 described in reference to FIG. 1. The first, second, third, fourth, and fifth processing circuits 206, 208, 210, 212, 214 may incorporate features of the various devices 104-120 described in reference to FIG. 1. It should be understood that the system 200 may include fewer or additional processing circuits than those shown in FIG. 2.

The network interface device 202 is structured to route data packets from the first processing circuit 206 to one or more of the second, third, fourth, and fifth processing circuits 208, 210, 212, 214 along predetermined network pathways defined by virtual links. The configuration engine 204 includes a virtual link configuration 215 for a plurality of virtual links. The virtual link configuration 215 is indexed by virtual link IDs uniquely assigned to each virtual link. The virtual link configuration 215 indicates a priority and a predetermined network pathway for communicating data packets from the first processing circuit 206 to one or more of the second, third, fourth, and fifth processing circuits 208, 210, 212, 214. As discussed in further detail below, the configuration engine 204 is structured to automatically assign priority to virtual links based on at least one of a latency or a jitter requirement of the corresponding destination processing circuit(s) for the virtual link.

The network interface device 202 may include one or more switches to route data packets. In the exemplary embodiment illustrated in FIG. 2, the network interface device 202 includes a first switch 216, a second switch 218, and a third switch 220. As will be appreciated, at least some of the virtual links are automatically assigned a priority at time of configuration on a per switch output port basis. The switches 216, 218, 220 may be integrated in a single network interface device 202 or may be physically disparate/autonomous devices. Each switch 216, 218, 220 may retrieve the virtual link configuration 215 from the configuration engine 204, may store a local instance of the virtual link configuration 215 which can be managed by the configuration engine 204, or may store a local instance of the configuration engine 204 (each of which may be managed using a configuration tool).

The first switch 216 includes first, second, and third communications interfaces 222, 224, 226. The first communications interface 222 is structured to receive data packets. In the exemplary embodiment illustrated in FIG. 2, the first communications interface 222 is operatively coupled to the first processing circuit 206 and is structured to receive data packets therefrom. In some instances, the first communications interface 222 is referred to as an "input port." The second and third communications interfaces 224, 226 are structured to transmit data packets. In the exemplary embodiment illustrated in FIG. 2, the second communications interface 224 is operatively coupled to the second processing circuit 208 and is structured to transmit data packets thereto, and the third communications interface 226 is operatively coupled to the second switch 218 and is structured to transmit data packets thereto. In some instances, the second and third communications interfaces 224, 226 are referred to as "output ports." It will be appreciated that the first, second, and third communications interfaces 222, 224, 226 may be configured as components of the first switch 216, as physical interfaces to the network interface device 202, as logical interfaces, or otherwise configured to connect the first and second processing circuits 206, 208 to the network interface device 202. The first, second, and third communications interfaces 222, 224, 226 may be configured to communicate data packets according to an Ethernet-based protocol.

The first switch 216 also includes first and second output queues 228, 230. In some instances, the first switch 216 receives data packets at a rate that exceeds the rate at which the first switch 216 can transmit the data packets. As such, the first switch 216 may temporarily store multiple data packets in at least one of the first and second output queues 228, 230, where the data packets are scheduled for transmission. In some implementations, the first and second output queues 228, 230 operate on a first-in, first-out (FIFO) basis. This means that a new data packet is placed at the end of the respective queue and is transmitted after the data packets in front of it are transmitted. Although not illustrated in FIG. 2, it should be appreciated that the first switch 216 may also include an input queue. The first switch 216 of FIG. 2 is illustrated as having only one output queue per communication interface (output port); however, it should be understood that, in some embodiments, the first switch 216 includes multiple output queues per communication interface.

Congestion in queues is one way in which latency and/or jitter are introduced into data packets. As discussed further herein and according to exemplary embodiments of the inventive concepts disclosed herein, the network interface device 202 is structured to automatically assign priority to individual virtual links on a per switch output port basis. For example, different priorities may be assigned to the first and second output queues 228, 230 depending on latency and/or jitter requirements of the destination processing circuit(s) (e.g., the second, third, fourth, and fifth processing circuits 208, 210, 212, 214 are destination processing circuits of the first switch 216; the third, fourth, and fifth processing circuits 210, 212, 214 are destination processing circuits of the second switch 218; and the fourth and fifth processing circuits 212, 214 are destination processing circuits of the third switch 220). More specifically, as explained in further detail below, certain virtual links define network pathways through certain output queues and output ports. For example, a first virtual link may pass through the first output queue 228 and the second communications interface 224 en route to the second processing circuit 208. A second virtual link may pass through the second output queue 230 and the third communications interface 226 en route to the third processing circuit 210 via the second switch 218. If the third processing circuit 210 has a tighter latency requirement than the second processing circuit 208, the network interface device 202 can assign a higher priority to the second output queue 230 than the first output queue 228 of the first switch 216.

In some embodiments, a first virtual link routes data packets from the first processing circuit 206 to each of the first, second, third, fourth, and fifth processing circuits 206, 208, 210, 212, 214. Accordingly, for data packets including the virtual link ID of the first virtual link, the network interface device 202 can assign a higher priority to the second output queue 230 than the first output queue 228 of the first switch 216 if the third processing circuit 210 has a tighter latency requirement than the second processing circuit 208.

The second switch 218 may be structured in a generally similar manner as the first switch 216. In particular, the second switch 218 includes first, second, and third communications interfaces 232, 234, 236 and first and second output queues 238, 240. In the exemplary embodiment illustrated in FIG. 2, the first communications interface 232 is operatively coupled to the third communications interface 226 of the first switch 216 and is structured to receive data packets therefrom. The second communications interface 234 is operatively coupled to the third processing circuit 210 and is structured to transmit data packets thereto, and the third communications interface 236 is operatively coupled to the third switch 220 and is structured to transmit data packets thereto. It will be appreciated that the first, second, and third communications interfaces 222, 224, 226 may be configured as components of the second switch 218, as physical interfaces to the network interface device 202, as logical interfaces, or otherwise configured to connect the first and third processing circuits 206, 210 to the network interface device 202. The first, second, and third communications interfaces 232, 234, 236 may be configured to communicate data packets according to an Ethernet-based protocol.

The third switch 220 may be structured in a generally similar manner as the first and second switches 216, 218. In particular, the second switch 218 includes first, second, and third communications interfaces 242, 244, 246 and first and second output queues 248, 250. In the exemplary embodiment illustrated in FIG. 2, the first communications interface 242 is operatively coupled to the third communications interface 236 of the second switch 218 and is structured to receive data packets therefrom. The second communications interface 244 is operatively coupled to the fourth processing circuit 212 and is structured to transmit data packets thereto, and the third communications interface 246 is operatively coupled to the fifth processing circuit 214 and is structured to transmit data packets thereto. It will be appreciated that the first, second, and third communications interfaces 242, 244, 246 may be configured as components of the third switch 220, as physical interfaces to the network interface device 202, as logical interfaces, or otherwise configured to connect the first, fourth, and fifth processing circuits 206, 212, 214 to the network interface device 202. The first, second, and third communications interfaces 242, 244, 246 may be configured to communicate data packets according to an Ethernet-based protocol. It should be understood that any of the first, second, and third switches 216, 218, 220 may include more than input port, and may include more or fewer than two output ports.

In some embodiments, the configuration engine 204 defines the virtual link configuration 215 for communicating data packets from the first processing circuit 206 along a predetermined network pathway to a one or more of the second, third, fourth, and fifth processing circuits 208, 210, 212, 214. In some embodiments, the configuration engine 204 (e.g., implemented by a switch network configuration tool) automatically assigns priorities to virtual links during a configuration process. For example, in one embodiment, the configuration engine 204 reads a configuration file with a list of virtual links and their paths. In one embodiment, the configuration engine 204 automatically assigns priorities to all of the virtual links. In another embodiment, the configuration engine 204 assigns priorities to some virtual links, and priority is assigned manually to other virtual links. For example, the configuration file may specify priorities for the manually assigned virtual links, and the virtual links to be assigned automatically may be identified with a priority of "AUTO," or other suitable nomenclature. The priority assignments may include a first priority corresponding to a first priority level and a second priority corresponding to a second priority level. In some embodiments, the priority assignments include more than two priorities. In one arrangement, the first priority level indicates a "high" priority and the second priority level indicates a "low" priority. Data packets associated with the first priority level are transmitted with a higher priority than data packets associated with the second priority level.

As mentioned above, the configuration engine 204 is structured to assign priorities to virtual links using at least one of latency or jitter requirements as the mechanism. For example, in one embodiment, the configuration engine 204 first sets all manually assigned virtual links to the static priorities listed in the configuration file. The configuration engine 204 also sets all automatically assigned virtual links to the lowest priority. The configuration engine 204 then configures the network and checks if all latency or jitter requirements are met. If all requirements are met, the assigned priorities are used. If not all requirements are met, the configuration engine 204 adjusts priorities of the particular output ports of virtual links that do not meet the requirements to a higher priority level. The configuration engine again configures the network and checks if all latency or jitter requirements are met, and performs as many iterations as are necessary to ensure that all requirements are met.

For example, in one embodiment, the configuration engine 204 automatically assigns priority to a first virtual link of a plurality of virtual links based on at least one of latency or jitter. The configuration engine 204 receives a static virtual link configuration indicating predetermined priorities corresponding to at least one second virtual link of the plurality of virtual links. The configuration engine 204 assigns the predetermined priority to each the corresponding second virtual link. The configuration engine 204 assigns the priority for the first virtual link to be the second priority level. The configuration engine 204 receives data packets for various virtual links. For a first data packet including the virtual link ID corresponding to the first virtual link, the configuration engine 204 detects at least one of latency or jitter of communication of the first data packet from the source processing circuit to the one or more destination processing circuits. The configuration engine 204 compares the at least one of the latency or the jitter to a timing threshold. Responsive to the at least one of the latency or the jitter being greater than the timing threshold, the configuration engine 204 assigns the priority for the first virtual link to be the first priority level.

The first, second, third, fourth, and fifth processing circuits 206, 208, 210, 212, 214 (e.g., control circuits, processing electronics) can include a processor and memory. The processor may be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various-activities and information structures of the inventive concepts disclosed herein. The memory is communicably connected to the processor and includes computer code or instruction modules for executing one or more processes described herein. The memory includes various circuits, software engines, and/or modules that cause the processor to execute the systems and methods described herein. The network interface device 202 and the configuration engine 204 may include similar electronic hardware as the first, second, third, fourth, and fifth processing circuits 206, 208, 210, 212, 214, such as for executing the processes described in reference to configuration engine 204.

The first processing circuit 206 is configured to generate one or more first data packets. The first data packets may be configured for communication to one or more of the second, third, fourth, and fifth processing circuits 208, 210, 212, 214. The first data packets may be configured according to an Ethernet-based protocol. The first data packets may be configured as an Ethernet frame. The first processing circuit 206 may be communicatively coupled to the network interface device 202. The first processing circuit 206 may be configured to transmit multiple sets of one or more data packets (e.g., first data packet(s), second data packet(s), third data packet(s)), which may each individually or collectively be transmitted on modified network pathways according to the inventive concepts disclosed herein. The first processing circuit 206 may be configured to receive one or more data packets from one or more of the second, third, fourth, and fifth processing circuits 208, 210, 212, 214.

In some embodiments, the virtual link configuration 215 may be associated with virtual links, which may be implemented according to an ARINC 664 protocol (e.g., ARINC 664 part 7 network protocol). For example, the configuration engine 204 can be configured to establish, store, generate, or otherwise provide virtual links between the first processing circuit 206 and one or more of the second, third, fourth, and fifth processing circuits 208, 210, 212, 214. In some embodiments, a virtual link defines a connection from the first processing circuit 206 to one or more of the second, third, fourth, and fifth processing circuits 208, 210, 212, 214. The connection may be at least one of unidirectional or logical. One or more of the first, second, and third switches 216, 218, 220 can be configured to transmit first data packets from the first processing circuit 206 to one or more of the second, third, fourth, and fifth processing circuits 208, 210, 212, 214 along virtual links defined by the virtual link configuration 215. In some embodiments, the first processing circuit 206 can be configured to generate the one or more first data packets to include a header identifying a desired virtual link, which may allow the first processing circuit 206 (e.g., applications being executed by the first processing circuit 206) to identify a selected one or more of the second, third, fourth, and fifth processing circuits 208, 210, 212, 214 as the destination(s) of the first data packet(s).

Referring to FIG. 2 in more detail, the system 200 includes the first virtual link 270. As illustrated in FIG. 2, the first virtual link 270 defines a predetermined pathway for transmitting data packets from the first processing circuit 206 to each of the second, third, fourth, and fifth processing circuits 208, 210, 212, 214 through a set of three switches including the first, second, and third switches 216, 218, 220.

As shown in FIG. 2, each of the second, third, fourth, and fifth processing circuits 208, 210, 212, 214 includes a theoretical latency constraint. The theoretical latency constraint may be a maximum allowed latency for each respective processing circuit. For example, as illustrated in in FIG. 2, the second processing circuit 208 has a latency requirement of 50 milliseconds, the third processing circuit 210 has a latency requirement of 10 milliseconds, the fourth processing circuit 212 has a latency requirement of 100 milliseconds, and the fifth processing circuit 214 has a latency requirement of 50 milliseconds.

With existing systems, a single global priority value would be assigned to the first virtual link 270 based on its worst-case need. In this instance, the priority value would likely be HIGH in order to meet the third processing circuit's 210 latency requirement of 10 milliseconds. A similar assessment would need to be performed for each virtual link in the system. Existing avionic networking systems can include approximately 9,000 transmission and receipt virtual links.

According to embodiments of the inventive concepts disclosed herein, the configuration engine 204 of the system 200 is structured to automatically assign priority to virtual links on a per-output port basis based on at least one of latency or jitter. An example virtual link configuration 215 for the first virtual link 270 is shown below in Table 1.

TABLE 1

| Virtual Link Configuration 215 | | |
| --- | --- | --- |
| Virtual Link Identifier | Output Queue | Priority |
| VL 270 | S1Q1 | LOW |
|  | S1Q2 | HIGH |
|  | S2Q1 | HIGH |
|  | S2Q2 | LOW |
|  | S3Q1 | LOW |
|  | S3Q2 | HIGH |

As shown above in Table 1, the virtual link configuration 215 includes individual priority levels assigned to each output queue of the first, second, and third switches 216, 218, 220. For example, for the first switch 216, the first output queue 228 is operatively coupled to the second processing circuit 208, which has a 50 millisecond latency requirement. The second output queue 230 is operatively coupled to each of the third, fourth, and fifth processing circuits 210, 212, 214, which have latency requirements of 10 milliseconds, 100 milliseconds, and 50 milliseconds, respectively. Therefore, the tightest latency requirement for the second output queue 230 is 10 milliseconds. The 50 millisecond latency requirement of the first output queue 228 is greater than the 10 millisecond latency requirement for the second output queue 230. Accordingly, the first output queue 228 of the first switch 216 is assigned a LOW priority and the second output queue 230 of the first switch 216 is assigned a HIGH priority.

For the second switch 218, the first output queue 238 is operatively coupled to the third processing circuit 210, which has a 10 millisecond latency requirement. The second output queue 240 is operatively coupled to each of the fourth and fifth processing circuits 212, 214, which have latency requirements of 100 milliseconds and 50 milliseconds, respectively. Therefore, the tightest latency requirement for the second output queue 240 is 50 milliseconds. The 10 millisecond latency requirement of the first output queue 238 is less than the 50 millisecond latency requirement for the second output queue 240. Accordingly, the first output queue 238 of the second switch 218 is assigned a HIGH priority and the second output queue 240 of the second switch 218 is assigned a LOW priority.

For the third switch 220, the first output queue 248 is operatively coupled to the fourth processing circuit 212, which has a 100 millisecond latency requirement. The second output queue 250 is operatively coupled to the fifth processing circuit 214, which has a latency requirement of 50 milliseconds. The 100 millisecond latency requirement of the first output queue 238 is greater than the 50 millisecond latency requirement for the second output queue 250. Accordingly, the first output queue 248 of the third switch 220 is assigned a LOW priority and the second output queue 250 of the third switch 220 is assigned a HIGH priority.

Figure 3:
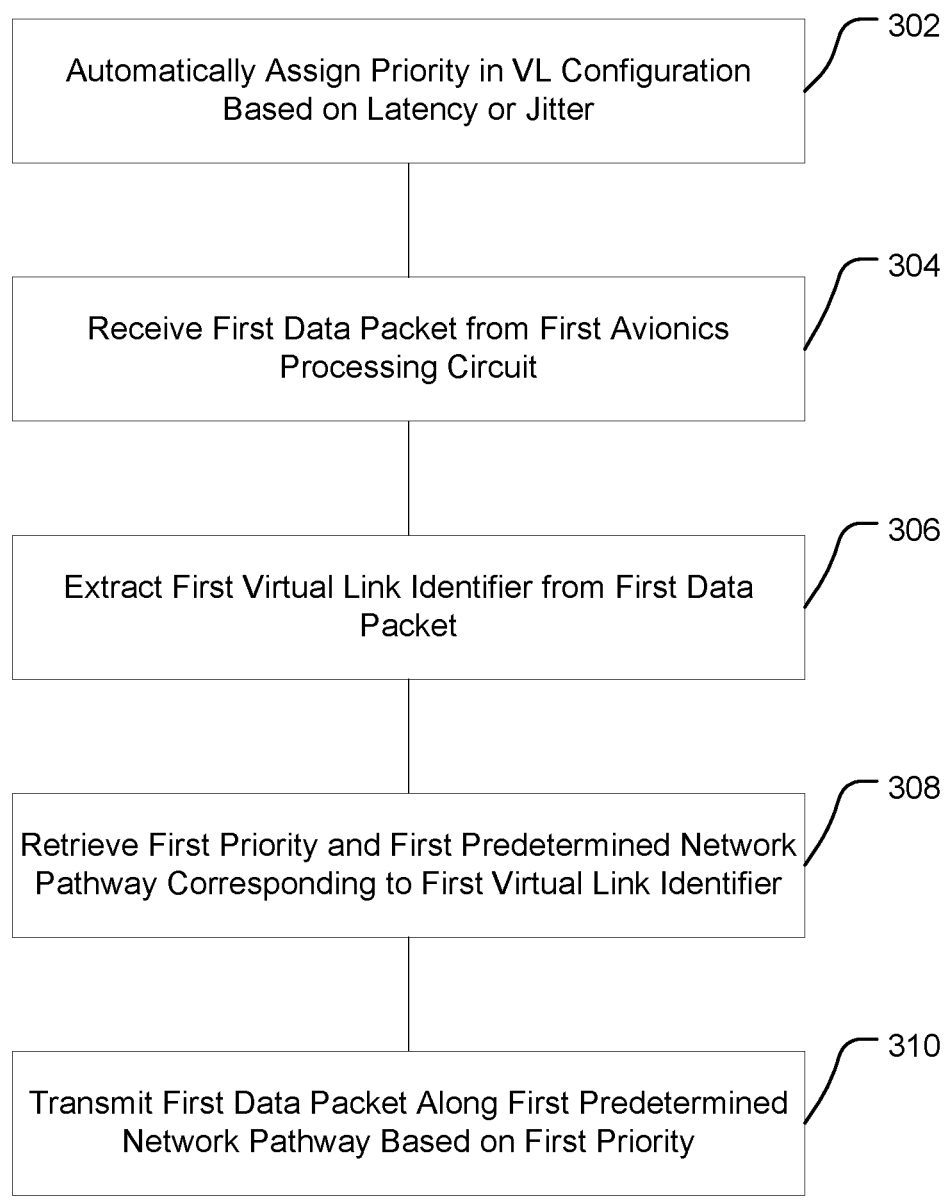
FIG. 3 is a diagram of an exemplary embodiment of a method for automatically assigning priority to virtual links on a per-output port basis, according to the inventive concepts disclosed herein.

Referring now to FIG. 3, an exemplary embodiment of a method 300 according to the inventive concepts disclosed herein may include the following steps. The method 300 may be executed using various hardware, apparatuses, and systems disclosed herein, such as the systems 100 and 200 and/or components or features thereof.

A step (302) may include automatically assigning priority, in a virtual link configuration, to one or more first virtual links of a plurality of virtual links. Priority is assigned based on at least one of latency or jitter. Each virtual link has a virtual link identifier. The virtual link configuration indicates the priority and a predetermined network pathway for communicating data packets from a first avionics processing circuit to one or more second avionics processing circuits. The priority can include at least a first priority level and a second priority level, such that data packets associated with the first priority level are transmitted with a higher priority than data packets associated with the second priority level. In some embodiments, step (302) is performed by a configuration engine operatively coupled to a network interface device. In some embodiments, automatically assigning the priority includes receiving a static virtual link configuration indicating predetermined priorities corresponding to at least one second virtual link of the plurality of virtual links. The predetermined priority is assigned to each corresponding second virtual link. The priority for each first virtual link is assigned to be the second priority level. For the first virtual link corresponding to the first data packet, the at least one of the latency or the jitter of communication of the first data packet from the first avionics processing circuit to the one or more second avionics processing circuits is detected. The at least one of the latency or the jitter is compared to a timing threshold. Responsive to the at least one of the latency or the jitter being greater than the timing threshold, assign the priority for the first virtual link to be the first priority level.

A step (304) may include receiving a first data packet from the first avionics processing circuit. In some embodiments, step (304) is performed by a network interface device including a switch. The first data packet may be communicated according to an Ethernet-based protocol, such as the ARINC-664 protocol.

A step (306) may include extracting a first virtual link identifier from the first data packet. The virtual link identifier indicates the first virtual link along which the first data packet was transmitted.

A step (308) may include retrieving a first priority and a first predetermined network pathway corresponding to the first virtual link identifier from the virtual link configuration. The first priority and the first predetermined network pathway may be retrieved by accessing the virtual link configuration and accessing the first priority and the first predetermined network pathway corresponding to the first virtual link identifier.

A step (310) may include transmitting the first data packet along the first predetermined network pathway based on the first priority. The first data packet can be transmitted to one or more processing circuits directly or by way of other switches. The first data packet may be communicated according to an Ethernet-based protocol, such as the ARINC-664 protocol.

As will be appreciated from the above, systems and methods for automatic priority assignment for virtual links according to embodiments of the inventive concepts disclosed herein may improve operation of aircraft and other platforms by using at least one of latency or jitter as a mechanism to define priorities for virtual links. Priority is assigned on a per-output port basis. Accordingly, the per-output port fidelity provided by the embodiments of the inventive concepts disclosed herein enables more efficient network routing than that capable with existing systems.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a first avionics processing circuit and at least one second avionics processing circuit; a configuration engine storing a virtual link configuration for a plurality of virtual links between the first and at least one second avionics processing circuit, each virtual link having a virtual link identifier, the plurality of virtual links including a first virtual link and a second virtual link,
receive a static virtual link configuration indicating a predetermined priority corresponding to the second virtual link, the predetermined priority is one of at least a first priority level or a second priority level, the first priority level higher than the second priority level;
assign the predetermined priority to the second virtual link;
assign a first priority to the first virtual link to be the second priority level as an assignment;
detect at least one of a latency or a jitter of communicating a first data packet from the first avionics processing circuit to the at least one second avionics processing circuit using the first virtual link;
compare the at least one of the latency or the jitter to a timing threshold; and update the assignment of the first priority to the first virtual link to be the first priority level responsive to the at least one of the latency or the jitter being greater than the timing threshold; and
a switch coupled with the first and at least one second avionics processing circuit, the switch configured to receive the first data packet from the first avionics processing circuit, extract a first virtual link identifier from the first data packet, retrieve the first priority and a first predetermined network pathway associated with the first virtual link identifier from the virtual link configuration, and transmit the first data packet along the first predetermined network pathway based on the first priority, wherein data packets associated with the first priority level are transmitted with a higher priority level than data packets associated with the second priority level.

2. The system of claim 1, wherein the switch is an Ethernet switch.

3. The system of claim 1,
wherein the switch includes a first output port and a second output port; wherein the first predetermined network pathway includes the first output port; and wherein a second predetermined network pathway includes the second output port.

4. The system of claim 1, wherein the switch is configured to allocate the data packets associated with the first priority level to a first priority queue, allocate the data packets associated with the second priority level to a second priority queue, and transmit data packets allocated to the first priority queue before data packets allocated to the second priority queue.

5. The system of claim 1,
wherein the at least one second avionics processing circuit includes a third avionics processing circuit and a fourth avionics processing circuit;
wherein the first virtual link is associated with the third avionics processing circuit, the third avionics processing circuit having a first latency requirement;
wherein the second virtual link is associated with the fourth avionics processing circuit, the fourth avionics processing circuit having a second latency requirement longer than the first latency requirement; and
wherein the configuration engine is configured to assign the second priority level to the second virtual link in response to the second latency requirement being longer than the first latency requirement.

6. The system of claim 1,
wherein the at least one second avionics processing circuit includes a third avionics processing circuit and a fourth avionics processing circuit;
wherein the switch is a first switch communicatively coupled to the third avionics processing circuit; and
wherein the first predetermined network pathway includes the third avionics processing circuit;
the system further comprising:
a second switch configured to receive a second data packet from the first avionics processing circuit via the first switch, the fourth avionics processing circuit communicatively coupled to the second switch and configured to receive the second data packet from the second switch, and
wherein a second predetermined pathway includes the fourth avionics processing circuit.

7. The system of claim 6,
wherein the first switch comprises a first output port and a second output port, the first switch communicatively coupled to the third avionics processing circuit via the first output port;
wherein the second switch is communicatively coupled to the first switch via the second output port of the first switch;
wherein the fourth avionics processing circuit has a lower latency requirement than a latency requirement of the third avionics processing circuit;
wherein the configuration engine is configured to, based on the latency requirements of the third and fourth avionics processing circuits, assign the first priority level to the first virtual link and to assign the second priority level to the second virtual link.

8. The system of claim 1, wherein the switch is configured to operate according to an ARINC 664 part 7 protocol.

9. The system of claim 1, wherein the configuration engine automatically assigns priority to the first virtual link in response to a trigger signal including initialization of the configuration engine at startup of the system or a single user input.

10. The system of claim 1, wherein the switch is configured to extract the first virtual link identifier from a destination address portion of an Ethernet frame of the first data packet.

11. The system of claim 1, wherein the first avionics processing circuit and at least one second avionics processing circuit are part of an on-aircraft network.

12. The system of claim 11, wherein the at least one second avionics processing circuit comprises at least one of a flight management system, a global positioning system receiver, and a weather radar system.

13. The system of claim 11, wherein the at least one second avionics processing circuit comprises at least two of a flight management system, a global positioning system receiver, and a weather radar system.

14. The system of claim 1, wherein the first avionics processing circuit is an aircraft communication system capable of communicating off an aircraft.

15. The system of claim 1, wherein the jitter associated with communicating the first data packet from the first avionics processing circuit to the at least one second avionics processing circuit using the first virtual link is detected.

16. A method, comprising:
automatically assigning priority, in a virtual link configuration, to one or more first virtual links of a plurality of virtual links, each virtual link having a virtual link identifier, the virtual link configuration indicating the priority and a predetermined network pathway for communicating data packets from a first avionics processing circuit to at least one second avionics processing circuit, wherein the priority includes at least a first priority level and a second priority level, wherein data packets associated with the first priority level are transmitted with a higher priority than data packets associated with the second priority level, wherein automatically assigning priority comprises:
receiving a static virtual link configuration indicating a predetermined priority corresponding to a second virtual link of the plurality of virtual links;
assigning the predetermined priority to the second virtual link;
assigning a first priority for each first virtual link to be the second priority level; detecting at least one of a latency or a jitter of communicating a first data packet from the first avionics processing circuit to the at least one second avionics processing circuit using a first detect link of the one or more first virtual links;
comparing the at least one of the latency or the jitter to a timing threshold; and responsive to the at least one of the latency or the jitter being greater than the timing threshold, assigning the first priority for each first virtual link to be the first priority level; receiving the first data packet from the first avionics processing circuit; extracting a first virtual link identifier from the first data packet; retrieving the first priority and a first predetermined network pathway corresponding to the first virtual link identifier from the virtual link configuration; and transmitting the first data packet along the first predetermined network pathway based on the first priority.

17. The method of claim 16, wherein the at least one second avionics processing circuit includes a third avionics processing circuit and a fourth avionics processing circuit;
   wherein the first detect link is associated with the third avionics processing circuit, the third avionics processing circuit having a first latency requirement;
   wherein the second virtual link is associated with the fourth avionics processing circuit, the fourth avionics processing circuit having a second latency requirement longer than the first latency requirement; and
   wherein automatically assigning priority includes assigning the first priority level to the first detect link and assigning the second priority level to the second virtual link.

18. The method of claim 16, wherein the at least one second avionics processing circuit comprises at least one of a flight management system, a global positioning system receiver, and a weather radar system.

19. The method of claim 16, wherein the jitter associated with communicating the first data packet from the first avionics processing circuit to the at least one second avionics processing circuit using the first detect link is detected.

20. The method of claim 16, wherein the latency associated with communicating the first data packet from the first avionics processing circuit to the at least one second avionics processing circuit using the first detect link is detected.

* * * * *